US011922791B2

(12) United States Patent
Abdelhamid et al.

(10) Patent No.: US 11,922,791 B2
(45) Date of Patent: Mar. 5, 2024

(54) REAR SEAT OCCUPANT INDICATION SYSTEM AND METHOD

(71) Applicant: Ford Global Technologies, LLC, Dearborn, MI (US)

(72) Inventors: Mahmoud Abdelhamid, Canton, MI (US); Meisam Lois Yousif, West Bloomfield, MI (US); Manibharathi Gudiyattam Gnanamurugan, Southfield, MI (US); Sonya Bentley, Walled Lake, MI (US); Saeed D. Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 114 days.

(21) Appl. No.: 17/676,413

(22) Filed: Feb. 21, 2022

(65) Prior Publication Data

US 2023/0267821 A1    Aug. 24, 2023

(51) Int. Cl.
| | |
|---|---|
| *G08B 21/00* | (2006.01) |
| *B60N 2/00* | (2006.01) |
| *B60R 21/015* | (2006.01) |
| *G08B 21/22* | (2006.01) |
| *G08B 21/24* | (2006.01) |

(52) U.S. Cl.
CPC ............ *G08B 21/22* (2013.01); *B60N 2/002* (2013.01); *B60R 21/01546* (2014.10); *G08B 21/24* (2013.01)

(58) Field of Classification Search
CPC ........ G08B 21/22; G08B 21/24; B60N 2/002; B60R 21/01546

USPC ........................................................ 340/457
See application file for complete search history.

(56) References Cited

U.S. PATENT DOCUMENTS

| | | | |
|---|---|---|---|
| 7,378,979 B2 | 5/2008 | Rams, Jr. | |
| 9,403,437 B1* | 8/2016 | McDonald | ............ B60K 37/02 |
| 9,975,380 B1 | 5/2018 | Voss et al. | |
| 10,343,553 B2 | 7/2019 | Dicanosa et al. | |
| 11,097,659 B1 | 8/2021 | Abdelhamid et al. | |
| 2008/0055064 A1* | 3/2008 | Keith | ...................... B60N 2/002 |
| | | | 340/457.1 |
| 2009/0179774 A1* | 7/2009 | Mohan | .................. G08G 1/0965 |
| | | | 340/902 |
| 2011/0074565 A1* | 3/2011 | Cuddihy | ................ G08B 21/24 |
| | | | 340/457 |
| 2013/0009766 A1* | 1/2013 | Shaw | ....................... B60N 2/26 |
| | | | 340/457 |
| 2013/0201013 A1* | 8/2013 | Schoenberg | ............. B60Q 1/00 |
| | | | 340/438 |
| 2019/0263320 A1* | 8/2019 | Onodera | ................... B60Q 9/00 |
| 2021/0153478 A1* | 5/2021 | Mathew | ................. G08B 21/22 |
| 2021/0268990 A1* | 9/2021 | Dodson | .................. B60Q 1/544 |

* cited by examiner

*Primary Examiner* — Mark S Rushing
(74) *Attorney, Agent, or Firm* — Frank A. MacKenzie; Bejin Bieneman PLC

(57) ABSTRACT

A system and method for a vehicle includes detecting within a first predetermined time period of a vehicle ignition transitioning from an OFF status to an ON status: (a) a rear door OPEN status; and (b) at least one of: (i) a stored record of rear seat occupancy; and (ii) a rear seat belt BUCKLED status; and outputting a rear seat occupancy indicator within the vehicle upon detecting the vehicle ignition transitioning from the ON status to the OFF status.

18 Claims, 4 Drawing Sheets

REAR SEAT OCCUPANT INDICATION SYSTEM AND METHOD

BACKGROUND

Vehicles can be equipped with computing devices, networks, sensors, and controllers to acquire data regarding the vehicle's environment and assist in operation of the vehicle based on the data. Vehicle sensors can be used to provide data to an operator or occupant of the vehicle. Vehicle computing devices can also communicate with other computing devices to assist the operator.

DETAILED DESCRIPTION

Figure 1:
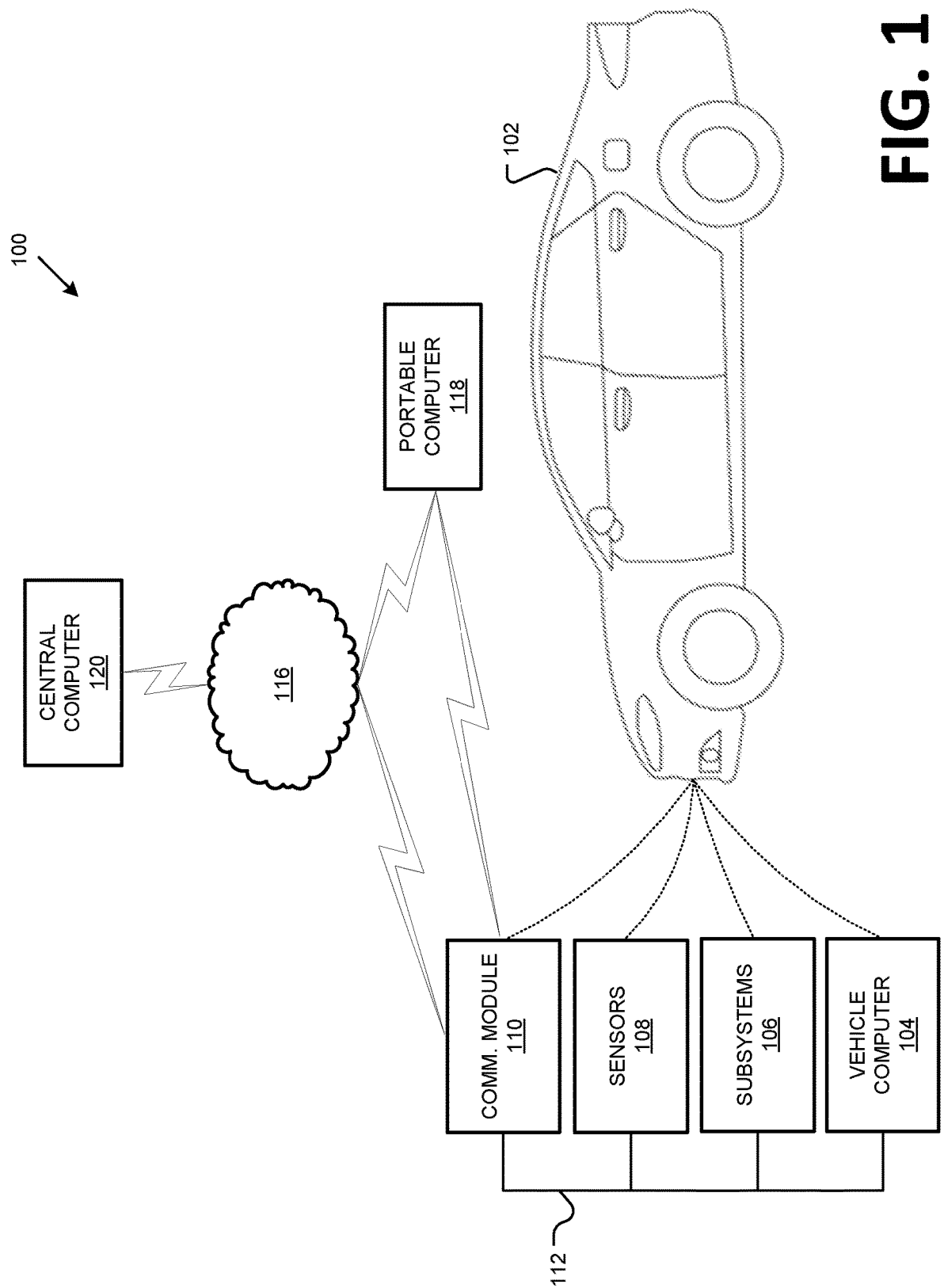
FIG. 1 illustrates an example vehicle rear seat occupancy detection system.

The present disclosure recognizes that the presence of an occupant in a rear seat of a vehicle may be implied under certain conditions, such as when (i) a rear door of the vehicle has been opened shortly before or anytime after the ignition is turned on, and (ii) a rear seat belt has been buckled or there is a stored record of a removable seat being used in the vehicle (wherein a seat belt may not be used to secure the passenger). When these conditions imply the presence of a rear seat occupant, an operator of the vehicle may receive one or more indications (i.e., reminders) when the ignition is turned off, and further indications/reminders can be stopped after the rear door has been opened, implying an exit of the rear occupant.

In an implementation, a computing device of a vehicle includes a processor and a memory, the memory stores instructions executable by the processor, and the instructions include instructions to: detect within a first predetermined time period of a vehicle ignition transitioning from an OFF status to an ON status: (a) a rear door OPEN status; and (b) at least one of (i) a stored record of rear seat occupancy, and (ii) a rear seat belt BUCKLED status; and output a rear seat occupancy indication within the vehicle upon detecting the vehicle ignition transitioning from the ON status to the OFF status.

The first predetermined time period may include time prior to the vehicle ignition transitioning to the ON status and time after the vehicle ignition has transitioned to the ON status.

The time prior to the vehicle ignition transitioning to the ON status may be 15 minutes and the time after the vehicle ignition has transitioned to the ON status may be an entire time the vehicle ignition remains in the ON status.

The computing device may further include instructions to: detect an operator door transition from an OPEN status to a CLOSED status after outputting the rear seat occupancy indication; start a countdown timer upon detection of the operator door transition from an OPEN status to a CLOSED status; determine a rear door status during operation of the countdown timer; and provide a second indication exterior to the vehicle upon an expiration of the countdown timer without a determination of a rear door OPEN status.

The computing device may also include instructions to: determine whether a cargo door indicates an OPEN status during operation of the countdown timer; and reset the countdown timer upon detecting the cargo door transitioning from an OPEN status to a CLOSED status.

The rear seat occupancy indication may include a display message and a chime, and the second indication may include at least one of a horn honk/chirp and a flash of exterior lights.

The computing device may also include instructions to: start a second countdown timer upon completion of the second indication external to the vehicle; determine a rear door status during operation of the countdown timer; and notify a server to send push notifications to a mobile device of an operator of the vehicle upon an expiration of the second countdown timer without a determination of a rear door OPEN status, wherein the push notifications are sent at a configurable frequency for a configurable duration until an indication of a rear door OPEN status or an indication from the mobile device that no rear occupant is in the vehicle.

The computing device may further include instructions to attenuate any other media audio to a lower volume during output of the chime of the rear seat occupancy indication.

The computing device may also include instructions to provide a human machine interface (HMI) element configured to customize notifications to include: (i) only the rear seat occupancy indication within the vehicle; (ii) the rear seat occupancy indication within the vehicle and a second indication external of the vehicle; or (iii) the rear seat occupancy indication within the vehicle, the second indication external of the vehicle, and a third indication pushed to a mobile device of an operator of the vehicle.

In another implementation, a method for a vehicle includes: detecting within a first predetermined time period of a vehicle ignition transitioning to from an OFF status to an ON status: (a) a rear door OPEN status; and (b) at least one of: (i) a stored record of rear seat occupancy; and (ii) a rear seat belt BUCKLED status; and outputting a rear seat occupancy indication within the vehicle upon detecting the vehicle ignition transitioning from the ON status to the OFF status.

The first predetermined time period may include a time prior to the vehicle ignition transitioning to the ON status and a time after the vehicle ignition has transitioned to the ON status.

The time prior to the vehicle ignition transitioning to the ON status may be 15 minutes and the time after the vehicle ignition has transitioned to the ON status may be an entire time the vehicle ignition remains in the ON status.

The method may further include: detecting an operator door transition from an OPEN status to a CLOSED status after the outputting of the rear seat occupancy indication; starting a countdown timer upon detection of the operator door transition from an OPEN status to a CLOSED status; determining whether a rear door indicates an OPEN status during operation of the countdown timer; and providing a second indication exterior to the vehicle upon an expiration of the countdown timer without an indication of a rear door in an OPEN status.

The method may also include: determining whether a cargo door indicates an OPEN status during operation of the countdown timer; and resetting the countdown timer upon detecting the cargo door indication of a transition from an OPEN status to a CLOSED status.

In the method, the rear seat occupancy indication may include a display message and a chime, and the second indication may include at least one of a horn honk/chirp and a flash of exterior lights.

The method may further include: starting a second countdown timer upon completion of the second indication external to the vehicle; determining a rear door status during operation of the countdown timer; and notifying a server to send push notifications to a mobile device of an operator of the vehicle upon an expiration of the second countdown timer without a determination of a rear door OPEN status, wherein the push notifications are sent at a configurable frequency for a configurable duration until an indication of a rear door OPEN status or an indication from the mobile device that no rear occupant is in the vehicle.

The method may also include attenuating any other media audio to a lower volume during output of the chime of the rear seat occupancy indication.

The method may further include: providing a human machine interface (HMI) element to turn the method off for the vehicle; and providing a periodic message to the HMI to inquire whether the operator wants to turn the method back on.

The method may further include resetting a status to provide a rear seat occupancy indication within the vehicle upon detecting the vehicle ignition transitioning from the ON status to the OFF status upon the following conditions occurring within 15 minutes of providing the rear seat occupancy indication: detecting the vehicle ignition transitioning from the OFF status to the ON status; and not detecting an indication of a rear door in an OPEN status.

The method may further include providing a human machine interface (HMI) element configured to customize notifications to include: (i) only the rear seat occupancy indication within the vehicle; (ii) the rear seat occupancy indication within the vehicle and a second indication external of the vehicle; or (iii) the rear seat occupancy indication within the vehicle, the second indication external of the vehicle, and a third indication pushed to a mobile device of an operator of the vehicle.

With reference to FIG. 1, a rear seat occupant detection and indication (RSOD) system 100 can provide communications between vehicle 102 and one or more portable computers 118, and a central computer 120 to provide rear seat occupancy indication(s), such as to an operator of the vehicle 102. The portable computer 118 can communicate directly or indirectly with vehicle 102 to configure or control the RSOD system 100, and can further receive indications from the vehicle 102 and/or central computer 120, as will be discussed in further detail.

A vehicle 102 is a set of components or parts, including hardware components and typically also software and/or programming, to perform a function or set of operations in the vehicle 102. Vehicle subsystems 106 typically include a braking system, a propulsion system, and a steering system as well as other subsystems including, e.g., a climate control system, a lighting system, an infotainment system, etc. The propulsion subsystem converts energy to rotation of vehicle 102 wheels to propel the vehicle 102 forward and/or backward. The braking subsystem can slow and/or stop vehicle 102 movement. The steering subsystem can control a yaw, e.g., turning left and right, maintaining a straight path, of the vehicle 102 as it moves.

Computers, including the herein-discussed vehicle computer 104, portable computer 118, and central computer 120, include respective processors and memories. A computer memory can include one or more forms of computer readable media, and stores instructions executable by a processor for performing various operations, including as disclosed herein. For example, the computer can be a generic computer with a processor and memory as described above and/or a vehicle computer 104, for example, may include an electronic control unit (ECU), controller, or the like for a specific function or set of functions, and/or a dedicated electronic circuit including an ASIC that is manufactured for a particular operation, e.g., an ASIC for processing sensor data and/or communicating the sensor data. In another example, computer may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

A computer memory can be of any suitable type, e.g., hard disk drives, solid state drives, servers, or any volatile or non-volatile media. The memory can store data, e.g., a memory of a vehicle computer 104 can store data sent from vehicle sensors 108. The memory can be a separate device from the computer, and the computer can retrieve information stored in the memory, e.g., a vehicle computer 104 can obtain data to be stored via a vehicle network 112 in the vehicle 102, e.g., over a CAN bus, a wireless network, etc. Alternatively, or additionally, the memory can be part of the computer, i.e., as a memory of the computer.

The vehicle computer 104 can be included in a vehicle 102 that may be any suitable type of ground vehicle 102, e.g., a passenger or commercial automobile such as a sedan, a coupe, a truck, a sport utility, a crossover, a van, a minivan, etc. A vehicle computer 104 may include programming to operate one or more of vehicle 102 brakes, propulsion (e.g., control of acceleration in the vehicle 102 by controlling one or more of an internal combustion engine, electric motor, hybrid engine, etc.), steering, climate control, interior and/or exterior lights, etc., as well as to determine whether and when the computer, as opposed to a human operator, is to control such operations. Additionally, a vehicle computer 104 may be programmed to determine whether and when a human operator is to control such operations.

A vehicle computer 104 may include or be communicatively coupled to, e.g., via a vehicle network 112 such as a communications bus as described further below, more than one processor, e.g., included in components such as sensors 108, electronic controller units (ECUs) or the like included in the vehicle 102 for monitoring and/or controlling various vehicle components, e.g., a powertrain controller, a brake controller, a steering controller, etc. The computer is generally arranged for communications on a vehicle 102 communication network that can include a bus in the vehicle 102 such as a controller area network (CAN) or the like, and/or other wired and/or wireless mechanisms. Alternatively, or additionally, in cases where the computer actually comprises a plurality of devices, the vehicle 102 communication network may be used for communications between devices represented as the computer in this disclosure.

Various controllers and/or sensors 108 may provide data to the computer via the vehicle 102 communication network.

Vehicles 102 typically include a variety of sensors 108. A sensor is a device that can obtain one or more measurements of one or more physical phenomena. A sensor is a device that can obtain one or more measurements of one or more physical phenomena. Some sensors 108 detect internal states of the vehicle 102, for example, wheel speed, wheel orientation, and engine and transmission variables. Other sensors 108 detect the status of various components, such as ignition switch status, door position status, seatbelt latch status, audio volume status, etc. Often, but not necessarily, a sensor includes a digital-to-analog converter to converted sensed analog data to a digital signal that can be provided to a digital computer, e.g., via a network.

Various controllers in a vehicle 102 may operate as sensors 108 to provide data via the vehicle network 112 or bus, e.g., data relating to vehicle 102 speed, acceleration, location, subsystem and/or component status, etc.

A vehicle network 112 is a network via which messages can be exchanged between various devices in vehicle 102. The vehicle computer 104 can be generally programmed to send and/or receive, via vehicle network 112, messages to and/or from other devices in vehicle 102 e.g., any or all of ECUs, sensors 108, actuators, components, communications module, a human machine interface HMI, etc. Additionally, or alternatively, messages can be exchanged among various such other devices in vehicle 102 via a vehicle network 112. In cases in which the computer includes a plurality of devices, vehicle network 112 may be used for communications between devices represented as a computer in this disclosure. Further, as mentioned below, various controllers and/or vehicle sensors 108 may provide data to the computer. In some implementations, vehicle network 112 can be a network in which messages are conveyed via a vehicle 102 communications bus. For example, vehicle network 112 can include a controller area network (CAN) in which messages are conveyed via a CAN bus, or a local interconnect network (LIN) in which messages are conveyed via a LIN bus. In some implementations, vehicle network 112 can include a network in which messages are conveyed using other wired communication technologies and/or wireless communication technologies e.g., Ethernet, WiFi, Bluetooth, Ultra-Wide Band (UWB), etc. Additional examples of protocols that may be used for communications over vehicle network 112 in some implementations include, without limitation, Media Oriented System Transport (MOST), Time-Triggered Protocol TTP, and FlexRay. In some implementations, vehicle network 112 can represent a combination of multiple networks, possibly of different types, that support communications among devices in vehicle 102. For example, vehicle network 112 can include a CAN in which some devices in vehicle 102 communicate via a CAN bus, and a wired or wireless local area network in which some device in vehicle 102 communicate according to Ethernet or Wi-Fi communication protocols.

The vehicle computer 104, portable computer 118, and/or central computer 120 can communicate via a wide area network 116. Further, various computing devices discussed herein may communicate with each other directly, e.g., via direct radio frequency communications according to protocols such as Bluetooth or the like. For example, a vehicle 102 can include a communication module 110 to provide communications with devices and/or networks not included as part of the vehicle 102, such as the wide area network 116 and/or a portable computer 118, for example. The communication module 110 can provide various communications, e.g., vehicle to vehicle (V2V), vehicle-to-infrastructure or everything (V2X) or vehicle-to-everything including cellular communications (C-V2X) wireless communications cellular, dedicated short range communications (DSRC), etc., to another vehicle 102, to an infrastructure element typically via direct radio frequency communications and/or typically via the wide area network 116, e.g., to the central computer 120. The communication module 110 could include one or more mechanisms by which a vehicle computer 104 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, DSRC, cellular V2X, CV2X, and the like.

The portable computer 118 may include a smartphone, tablet, smartwatch, or other suitable portable computing device. The portable computer 118 may use any suitable wireless communications, such as cellular or WI-FI, to communicate with the central computer 120 via the wide area network 116.

Figure 2:
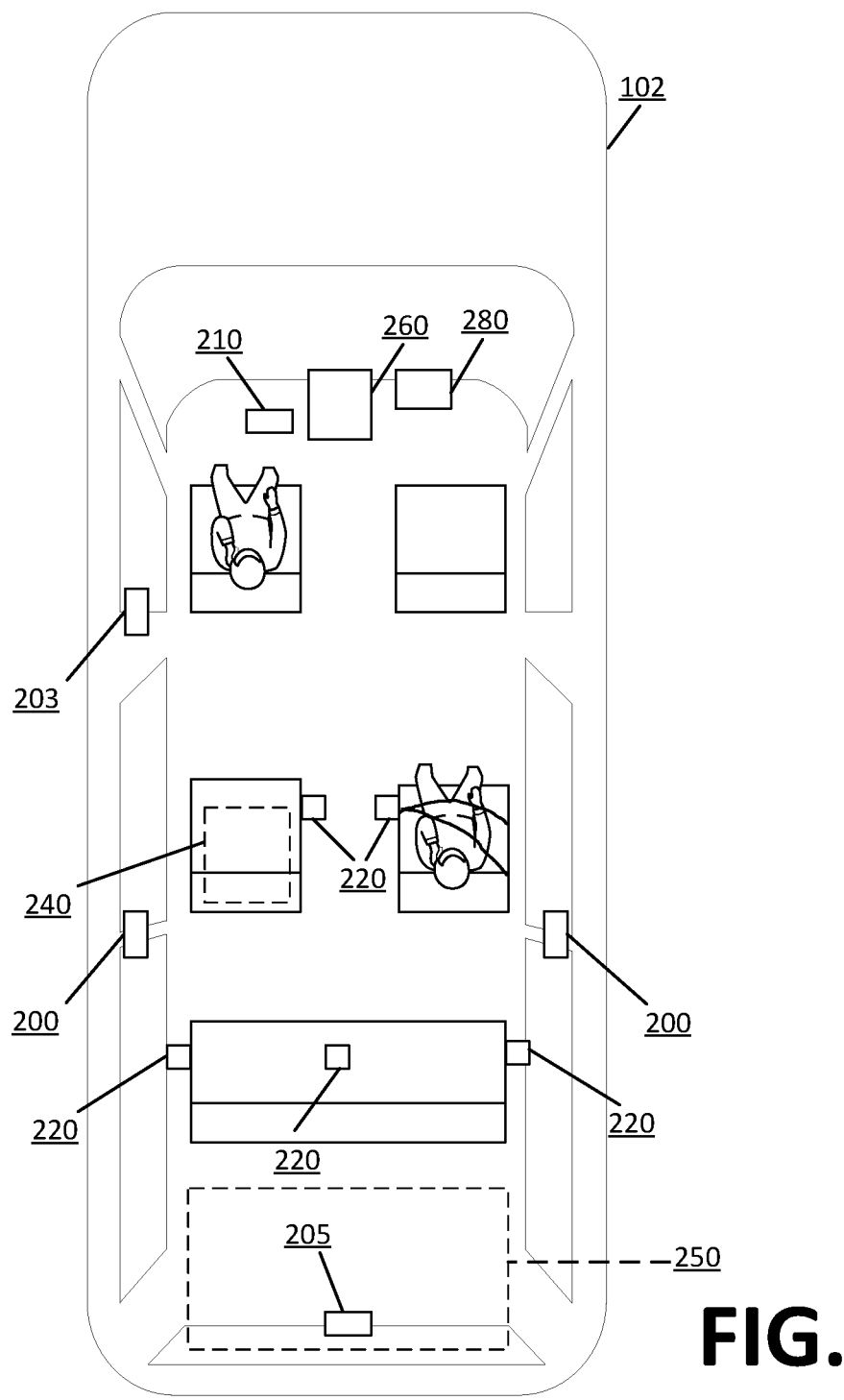
FIG. 2 illustrates an example vehicle.

With reference to FIG. 2, additional details of an example vehicle 102 are illustrated. In the illustrated example, vehicle 102 may include rear doors that have sensors 200 capable of indicating a status of whether the door is OPEN or CLOSED. The rear door sensor may take any suitable form such as, but not limited to, a spring-loaded switch mechanism that moves outward when the door is opened and is compressed by contact with a portion of the door when it is in a closed position so as to alternate between two positions indicative of the OPEN and CLOSED states, as is typically used for operating interior lights and/or indicating a door-ajar status on an instrument cluster.

Vehicle 102 further includes at least one front door for an operator to enter the vehicle 102, and this front door includes a front door sensor 203 capable of indicating a status of whether the door is OPEN or CLOSED. The front door sensor may take any suitable form such as, but not limited to, the structure disclosed above for rear door sensor 200.

The front of the vehicle 102 includes a seat for an operator and an ignition position sensor 210, typically adjacent the operator. The ignition position sensor 210 may take any suitable form, including, but not limited to, an ignition key position sensor or switch, a start-button status sensor or switch when in the presence of an electronic keyfob or enabled smartphone, and a pedal-position sensor or switch when in the presence of an electronic keyfob or enabled smartphone.

The vehicle 102 also includes a Human Machine Interface (HMI) 260 which permits input from the operator or other occupant, such as by a touchpad, touchscreen, or microphone, and output to the operator or other occupant such as by a display and/or speaker. HMI 260 is one of the vehicle subsystems 106 that is connected to the vehicle network 112 and vehicle computer 104, as shown in FIG. 1. A climate control system 280 may be another vehicle subsystem 106 that is connected to vehicle network 112 and may be controlled through HMI 260 and/or vehicle computer 104.

Vehicle 102 further includes rear seatbelt status sensors 220 associated with each rear seating position in the vehicle. The rear seatbelt status sensors 220 may take any suitable form such as, but not limited to, a switch mechanism in the buckle mechanism of the seatbelt that operates based on insertion of the latch so as to alternate between two positions indicative of an UNBUCKLED and BUCKLED states.

In some implementations, the vehicle 102 may have a removable seat 240 or the like installed in one of the rear seats. The operator may provide input that the removable seat 240 is installed in the vehicle 102 through HMI 260 so that the RSOD system 100 may store a record of rear seat occupancy, i.e., record that the removable seat 240 is in or on the vehicle rear seat. In an alternate implementation, a switch mechanism similar to the rear seatbelt status sensors 220 may be included in or provided for a Lower Anchor and Tether for CHildren (LATCH) to secure the removable seat 240 may provide a datum or data that can be stored or recorded indicating that the removable seat 240 is in the rear seat to the RSOD system 100.

Vehicle 102 may also include one or more cargo areas 250 such as a trunk, frunk (i.e., front trunk), or other interior area accessible by a hatch door or other cargo door. A cargo door status sensor 205 may be included and is configured to indicate a status of whether the cargo door is OPEN or CLOSED. The cargo door status sensor 205 may take any suitable form, as discussed above with respect to rear door status sensors 200.

In operation, the vehicle computer 104 is programmed with instructions to receive status data from sensors 108 (including, for example, sensors 200, 203, 205, 210, and 220) over vehicle network 112, receive user input directly from HMI 260, receive input indirectly from portable computer 118 and central computer 120 through communication module 110, and provide output through HMI 260 and through communications module 210 to central computer 120 and portable computer 118 through wide area network 116.

Figure 3:
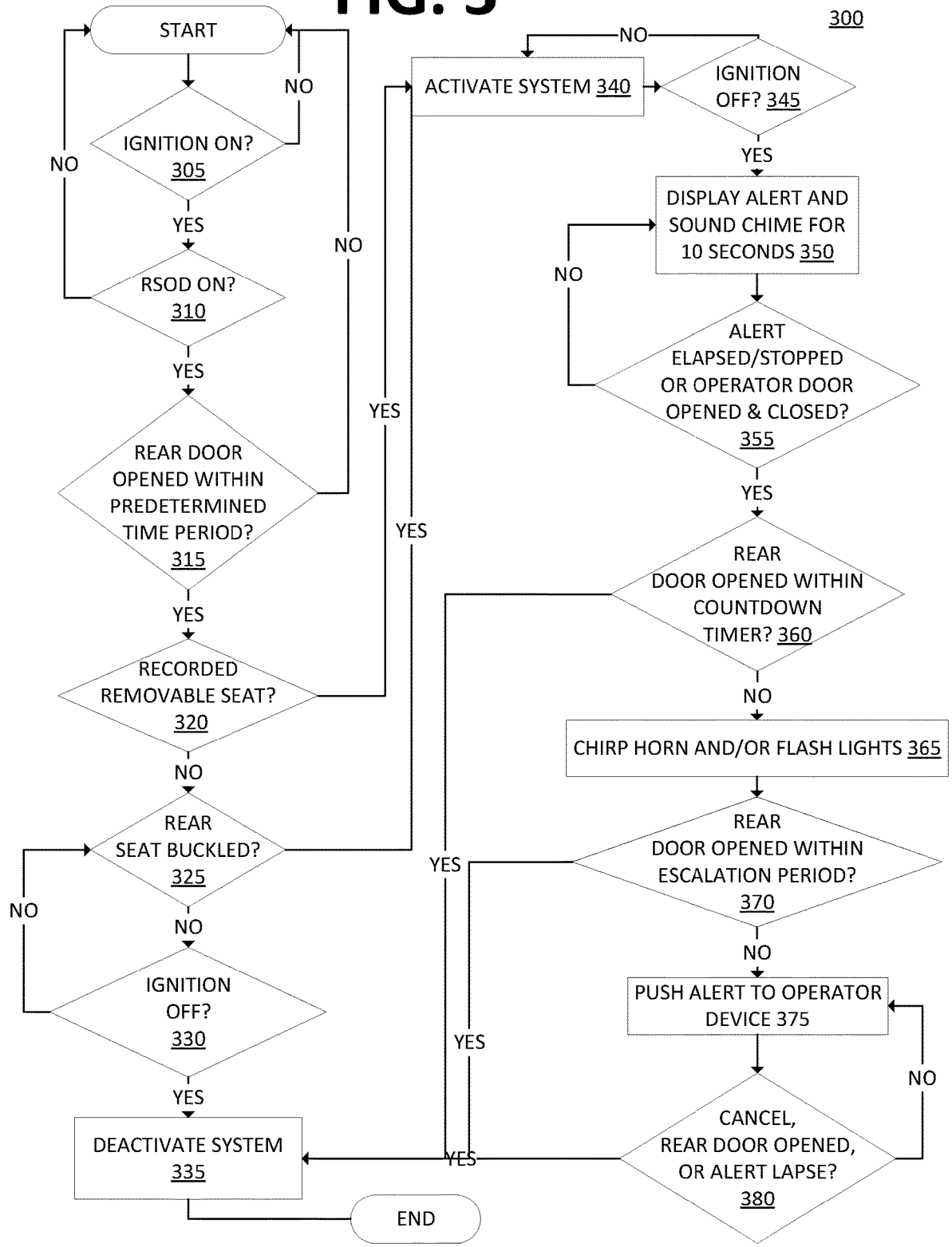
FIG. 3 is a flowchart illustrating an example process for rear seat occupancy detection.

Referring to FIG. 3, a flow diagram of one example of a RSOD method 300 is provided. The process 300 begins at block 305, in which vehicle computer 104 checks the ignition status (from ignition status sensor 210). If not (i.e., ignition status is OFF), the vehicle computer 104 returns to the start. If the ignition is on (i.e., ignition status is ON), the vehicle computer 104 determines whether the RSOD system 100 is turned on (i.e., enabled). As discussed further with respect to FIG. 4, an operator of vehicle 102 may want to opt out of using the RSOD system 100, in which case it may be turned off or disabled, for example, through a menu option of the HMI 260. If the RSOD system 100 is not on, the vehicle computer 104 returns to the start and performs the check of the block 310 each time the ignition is turned on at block 305, as well as anytime the RSOD system 100 status changes (enabled or disabled). If the RSOD system is turned on, the process moves to block 315 where the vehicle computer 104 determines if the rear door has been opened within a predetermined period of time. The predetermined period of time may include a portion of time (e.g., 15 minutes) before the ignition is turned on and the period of time the ignition is in an ON status, so as to operate when an occupant is placed in the rear seat before a trip as well as during a trip, e.g., if the vehicle 102 is stopped while the ignition is ON, the door is opened, and an occupant is placed in the rear seat, and the vehicle 102 resumes travel with the ignition not having been transition from the ON state, i.e., to an OFF state.

If the ignition has not been turned on when a rear door is opened, a body control module (BCM) or the like may timestamp the door opening, and at block 315, the vehicle computer 104 determines if the timestamp is within the predetermined period of time, for example, by comparing it with a timestamp of the ignition being turned on. If a rear door or rear doors are opened multiple times, the most recent timestamp is used in the comparison.

At block 315, if the vehicle computer 104 determines that the rear door has not been opened (i.e., rear door status is CLOSED) during the predetermined time period (i.e., the ignition is turned off without any opening of the rear door), the method returns to the start. If the vehicle computer 104 determines that the rear door has been opened (i.e., rear door status is OPEN) during the predetermined time period, the vehicle computer 104 determines whether the presence of a removable seat in the rear of the vehicle 102 has been recorded at block 320. If so, the RSOD system is activated (i.e., implies the presence of a rear seat occupant for later indications and monitoring) at block 340. If the presence of a removable seat in the rear of the vehicle 102 has not been recorded at block 320, such as with a stored record of rear seat occupancy, the vehicle computer 104 determines at block 325 whether a rear seat sensor indicates that a seatbelt has been buckled (i.e., rear seat sensor status is BUCKLED), and if so, the RSOD system is activated at block 340.

If the vehicle computer 104 determines at block 325 the rear seat sensor indicates that a seatbelt has not been buckled (i.e., rear seat sensor status is UNBUCKLED), the method moves to block 330. At block 330, the vehicle computer 104 determines whether the ignition has been turned off (i.e., ignition sensor status OFF). If the ignition has been turned off, the system is deactivated at block 335, and ends (going back to the start). If the ignition remains on, the method returns to block 315 to keep checking the rear seat occupant status.

When the RSOD system has been activated at block 340, the vehicle computer 104 periodically checks whether the ignition has been turned off (i.e., ignition status transitions from ON to OFF) at block 345. When the vehicle computer 104 determines that the ignition has been turned off, it outputs a rear seat occupancy indication within the vehicle. In an example, the indication is displayed on a display and sounds a chime or similar reminder sound for a brief second predetermined time period, e.g., 10 seconds or a similar amount of time, at block 350. In an example implementation, the indication is displayed in the display of the HMI 260 and the audible indication (chime) is provided through a speaker of the HMI 260. The HMI 260 may provide an interface, such as a "close" element on a touchscreen display, to stop/close the indication earlier than the complete second predetermined time period. At block 355, if the indication has not elapsed (e.g., less than 10 seconds), not been stopped/closed through the HMI 260, or the operator door has not been opened and closed (i.e., operator door status transitions from CLOSED to OPEN and from OPEN to CLOSED), the indication and chime continue for the second predetermined time period at block 350. In an example implementation, if any audio media is playing through the speaker, the system may attenuate the audio media (i.e., fully silence or set to a lower volume) so that the chime or other audio indication may be more perceptible to the operator.

If the vehicle computer 104 determines at block 355 that the indication has elapsed (e.g., 10 seconds have passed), that the indication has been stopped/closed through the HMI 260, or the operator door has been opened and closed (i.e., operator door status transitions from CLOSED to OPEN and from OPEN to CLOSED), the method moves to block 360, where a countdown timer (e.g., 30 second timer) is started and the computer 104 determines whether a rear door has been opened (i.e., rear door status transitions to OPEN) within the countdown timer period. If the rear door has been opened, the method moves to block 335 and deactivates the system.

If the computer 104 determines at block 360 that a rear door has not been opened (i.e., rear door status remains CLOSED) during the countdown timer period (i.e., the countdown timer period has expired without the rear door being opened), the method moves to block 365, where the vehicle computer 104 or other component of system 100 sends a second indication exterior to the vehicle 102, such as a signal to chirp the horn of the vehicle 102 (e.g., 3 short beeps) and/or flash the external lights of the vehicle 102.

After the second indication of block 365, the vehicle computer starts an escalation timer (e.g., a second countdown timer) at block 370, and determines whether a rear door is opened (i.e., rear door status transitions to OPEN) within the escalation timer period. If the rear door is opened during the escalation period, the method moves to block 335 and deactivates the system. If the rear door is not opened and the escalation period expires, the method moves to block 370. At block 370, the vehicle computer 104 may use communication module 110 and wide area network 116 to notify a server such as central computer 120 to send push notifications to a mobile device of an operator of the vehicle, such as portable computer 118, i.e., notifications or messages sent based on previously storing an identifier of the mobile device in a memory of one or both of the computers 104, 120, and a record that the mobile device is to receive such push notifications. The push notifications may be at a configurable frequency for a configurable duration until an indication of a rear door OPEN status or an indication from the mobile device that no rear occupant is in the vehicle 102. For example, a user may configure the push notifications to be sent at a frequency of every 5 minutes for a duration of 20 minutes using an application on their mobile device or in the vehicle's HMI 260.

A user or operator may use a mobile device to provide an indication that no rear occupant is in the vehicle in order to cancel the push notifications and deactivate the RSOD system, as illustrated at block 380. If not canceled, the rear door is not opened, or the indication duration has not lapsed, the push notifications of block 375 can continue. In one or more implementations, the user or operator may also use their mobile device to: (i) operate the vehicle climate control to protect a rear occupant; (ii) operate the windows to cool the vehicle; and/or (iii) unlock the door for others to assist a rear occupant. If the operator cancels the notification, the rear door is opened, or the indication duration has lapsed, the method moves to block 335 and deactivates the system.

Figure 4:
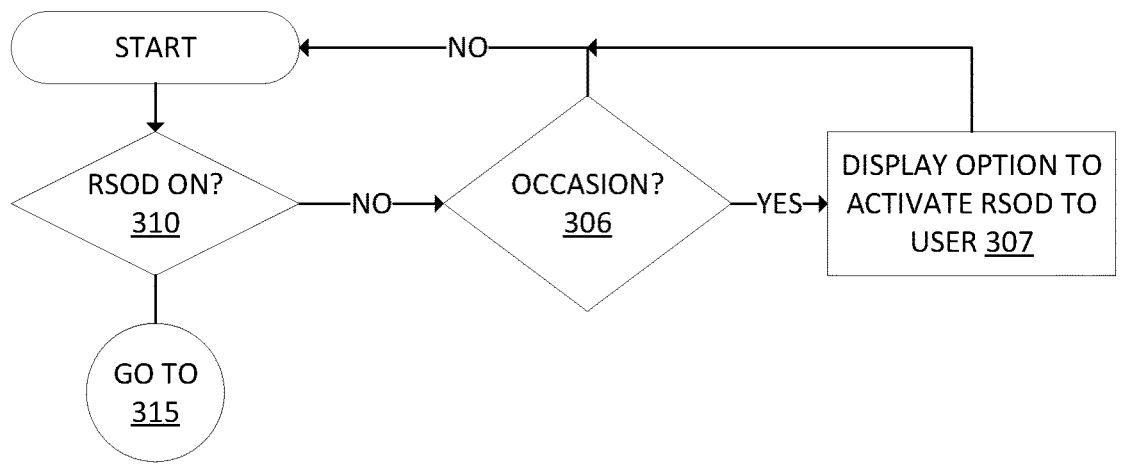
FIG. 4 is a flowchart illustrating an additional or alternate feature of rear seat occupancy detection.

FIG. 4 illustrates an implementation of an additional feature for occasionally checking whether a user wants to enable use of the system if it has been disabled by being turned off, such as through a menu selection via HMI 260. In FIG. 4, block 310 is as discussed above, and blocks 306 and 307 are shown as incorporated into a portion of the diagram of FIG. 3, with block 305 removed for clarity. The vehicle computer 104, upon determining at block 310 that the RSOD system 100 is not on, will check at block 306 whether an occasion has occurred, for example 6 months have passed, 6000 miles have been traveled, or a certain month has been reached, since the RSOD system 100 has been off. If not, it returns to the start. If the occasion has occurred, the method proceeds to block 307, where a user is given notice and an opportunity to turn the RSOD system 100 on, such as by displaying a message with an option to active the RSOD system 100 within the HMI 260. In another implementation, the system may notify the operator via their mobile device.

Figure 5:
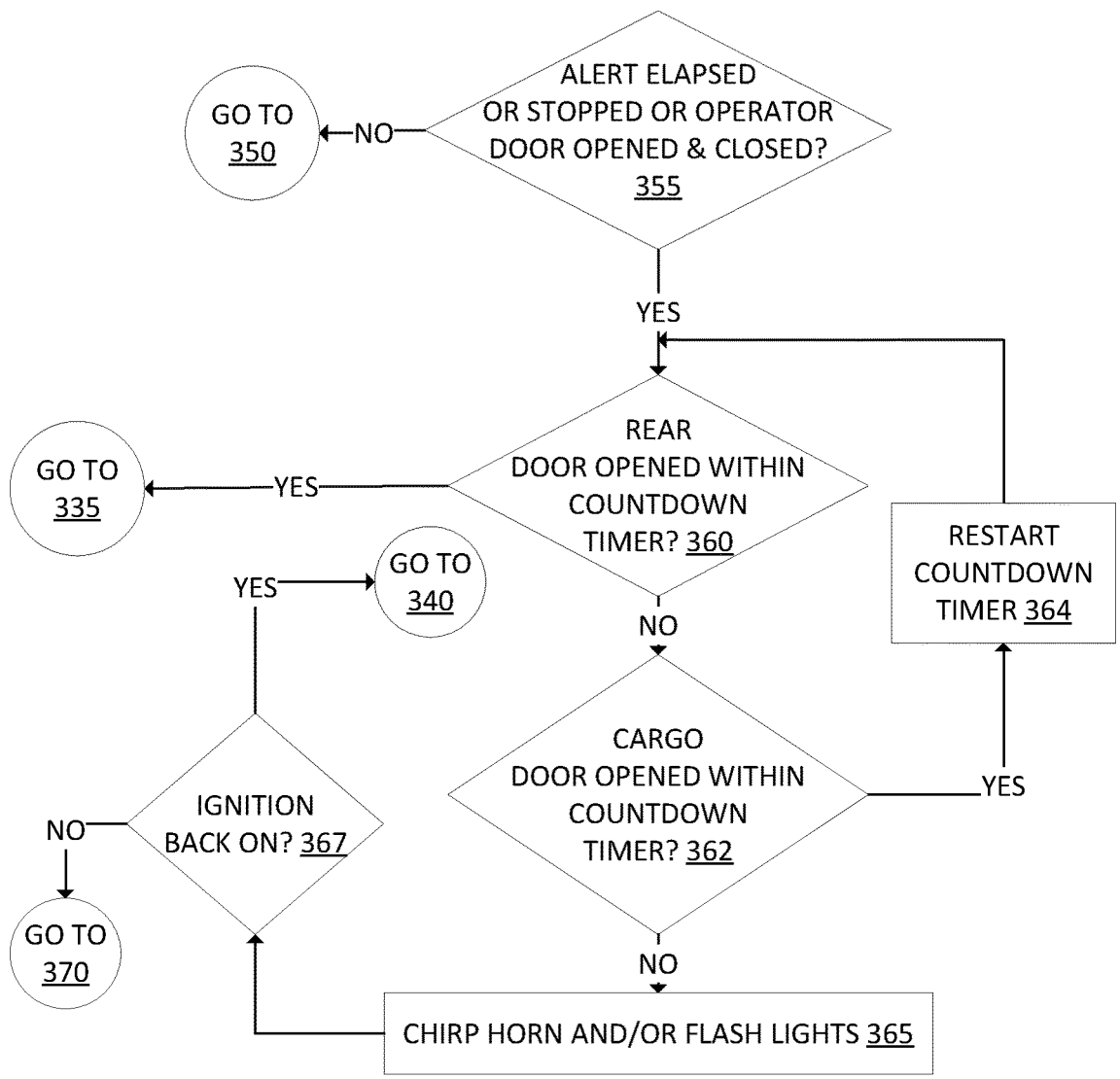
FIG. 5 is a flowchart illustrating another additional or alternate feature of rear seat occupancy detection.

FIG. 5 illustrates an implementation of another feature for permitting a user time to access a cargo area or briefly stop, such as for gas, wherein blocks are shown as incorporated into a portion of the diagram of FIG. 3.

When traveling, a vehicle user may need to access cargo prior to removing an occupant such as a child from a rear seat. In addition to checking rear door status during the countdown timer in block 360, the vehicle computer 104 may also determine whether a cargo door sensor status is opened or opened and closed at block 362, and if so, proceed to block 364 and restart the countdown timer. This permits additional time before the provision of external indications.

Additionally, it may be beneficial to check whether the ignition is switched back on at block 367 after a notification (block 355 or block 365) without the rear doors being opened. This can be limited to a certain period, such as approximately 15 minutes after stopping, and may address the problem of the system shutting down after brief stops with children remaining in the vehicle, such as stopping for gas, etc.

Computing devices discussed herein, including the vehicle computer 104, central computer 120, and portable computer 118, include processors and memories, each including instructions executable by one or more computing devices such as those identified above, and for carrying out blocks or steps of processes described above. As stated above, a smartphone, tablet, or other suitable portable computing device could comprise the portable computer 118. A portable computer can include various sensors such as one or more cameras, an accelerometer, and a location sensor, e.g., to determine a location according to the Global Positioning System (GPS), a microphone, etc. and may use any suitable wireless communications, such as cellular or WI-FI, to communicate with a central computer via a wide area network.

The vehicle can include an HMI human-machine interface, e.g., one or more of a display, a touchscreen display, a microphone, a speaker, etc. The user can provide input to devices such as the computer via the HMI. The HMI can communicate with the computer via the vehicle network, e.g., the HMI can send a message including the user input provided via a touchscreen, microphone, a camera that captures a gesture, etc., to a computer, and/or can display output, e.g., via a screen, speaker, etc.

Computer executable instructions may be compiled or interpreted from computer programs created using a variety of programming languages and/or technologies, including, without limitation, and either alone or in combination, Java, C, C++, Visual Basic, Java Script, Perl, Python, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc.

A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Use of in response to, upon determining, and upon detecting indicates a causal relationship, not merely a temporal relationship. Further, a status of ON, OFF, OPEN, CLOSED, BUCKLED, and UNBUCKLED refers to a state of an element as indicated by an associated sensor, and may be received directly over a network connection or accessed indirectly from a memory register or other storage location.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain implementations, and should in no way be construed so as to limit the claimed invention.

The invention claimed is:

1. A computing device of a vehicle comprising a processor and a memory, the memory storing instructions executable by the processor, the instructions including instructions to:
    detect within a first predetermined time period of a vehicle ignition transitioning from an OFF status to an ON status: (a) a rear door OPEN status; and (b) at least one of (i) a stored record of rear seat occupancy, and (ii) a rear seat belt BUCKLED status;
    output a rear seat occupancy indication within the vehicle upon detecting the vehicle ignition transitioning from the ON status to the OFF status;
    detect an operator door transition from an OPEN status to a CLOSED status after outputting the rear seat occupancy indication;
    start a countdown timer upon detection of the operator door transition from an OPEN status to a CLOSED status;
    determine a rear door status during operation of the countdown timer;
    provide a second indication exterior to the vehicle upon an expiration of the countdown timer without a determination of a rear door OPEN status;
    start a second countdown timer upon completion of the second indication external to the vehicle;
    determine a rear door status during operation of the second countdown timer; and
    notify a server to send push notifications to a mobile device of an operator of the vehicle upon an expiration of the second countdown timer without a determination of a rear door OPEN status.

2. The device of claim 1, wherein the first predetermined time period includes time prior to the vehicle ignition transitioning to the ON status and time after the vehicle ignition has transitioned to the ON status.

3. The device of claim 2, wherein the time prior to the vehicle ignition transitioning to the ON status is 15 minutes and the time after the vehicle ignition has transitioned to the ON status is an entire time the vehicle ignition remains in the ON status.

4. The device of claim 1, further including instructions to:
    determine whether a cargo door indicates an OPEN status during operation of the countdown timer; and
    reset the countdown timer upon detecting the cargo door transitioning from an OPEN status to a CLOSED status.

5. The device of claim 1, wherein the rear seat occupancy indication includes a display message and a chime, and the second indication includes at least one of a horn honk/chirp and a flash of exterior lights.

6. The device of claim 1,
    wherein the push notifications are sent at a configurable frequency for a configurable duration until an indication of a rear door OPEN status or an indication from the mobile device that no rear occupant is in the vehicle.

7. The system of claim 5, further including instructions to attenuate any other media audio to a lower volume during output of the chime of the rear seat occupancy indication.

8. The system of claim 1, further including instructions to provide a human machine interface (HMI) element configured to customize notifications to include:
    (i) only the rear seat occupancy indication within the vehicle;
    (ii) the rear seat occupancy indication within the vehicle and a second indication external of the vehicle; or
    (iii) the rear seat occupancy indication within the vehicle, the second indication external of the vehicle, and a third indication pushed to a mobile device of an operator of the vehicle.

9. A method for a vehicle comprising:
    detecting within a first predetermined time period of a vehicle ignition transitioning from an OFF status to an ON status: (a) a rear door OPEN status; and (b) at least one of: (i) a stored record of rear seat occupancy; and (ii) a rear seat belt BUCKLED status;
    outputting a rear seat occupancy indication within the vehicle upon detecting the vehicle ignition transitioning from the ON status to the OFF status;
    detecting an operator door transition from an OPEN status to a CLOSED status after the outputting of the rear seat occupancy indication;
    starting a countdown timer upon detection of the operator door transition from an OPEN status to a CLOSED status;
    determining whether a rear door indicates an OPEN status during operation of the countdown timer;
    providing a second indication exterior to the vehicle upon an expiration of the countdown timer without an indication of a rear door in an OPEN status;
    starting a second countdown timer upon completion of the second indication external to the vehicle;
    determining a rear door status during operation of the second countdown timer; and
    notifying a server to send push notifications to a mobile device of an operator of the vehicle upon an expiration of the second countdown timer without a determination of a rear door OPEN status.

10. The method of claim 9, wherein the first predetermined time period comprises a time prior to the vehicle ignition transitioning to the ON status and a time after the vehicle ignition has transitioned to the ON status.

11. The method of claim 10, wherein the time prior to the vehicle ignition transitioning to the ON status is 15 minutes and the time after the vehicle ignition has transitioned to the ON status is an entire time the vehicle ignition remains in the ON status.

12. The method of claim 9, further comprising:
    determining whether a cargo door indicates an OPEN status during operation of the countdown timer; and resetting the countdown timer upon detecting the cargo door indication of a transition from an OPEN status to a CLOSED status.

13. The method of claim 9, wherein the rear seat occupancy indication includes a display message and a chime, and the second indication includes at least one of a horn honk/chirp and a flash of exterior lights.

14. The method of claim 9,
wherein the push notifications are sent at a configurable frequency for a configurable duration until an indication of a rear door OPEN status or an indication from the mobile device that no rear occupant is in the vehicle.

15. The method of claim 13, further including attenuating any other media audio to a lower volume during output of the chime of the rear seat occupancy indication.

16. The method of claim 9, further comprising:
providing a human machine interface (HMI) element to turn the method off for the vehicle; and
providing a periodic message to the HMI to inquire whether the operator wants to turn the method back on.

17. The method of claim 9, further comprising resetting a status to provide a rear seat occupancy indication within the vehicle upon detecting the vehicle ignition transitioning from the ON status to the OFF status upon the following conditions occurring within 15 minutes of providing the rear seat occupancy indication:
detecting the vehicle ignition transitioning from an OFF status to an ON status; and
not detecting an indication of a rear door in an OPEN status.

18. The method of claim 9, further comprising providing a human machine interface (HMI) element configured to customize notifications to include:
(i) only the rear seat occupancy indication within the vehicle;
(ii) the rear seat occupancy indication within the vehicle and a second indication external of the vehicle; or
(iii) the rear seat occupancy indication within the vehicle, the second indication external of the vehicle, and a third indication pushed to a mobile device of an operator of the vehicle.

* * * * *